(12) United States Patent
Royak et al.

(10) Patent No.: US 9,595,896 B1
(45) Date of Patent: Mar. 14, 2017

(54) METHODS AND SYSTEMS FOR SENSORLESS CLOSED LOOP MOTOR SPEED AND TORQUE CONTROL

(71) Applicant: Rockwell Automation Technologies, Inc., Mayfield Heights, OH (US)

(72) Inventors: Semyon Royak, Orange Village, OH (US); Thomas Nondahl, Greenfield, WI (US); Jingya Dai, Burnaby (CA); Thomas M. Cahill, Mentor, OH (US); Robert J. Breitzmann, South Russell, OH (US); Peter B. Schmidt, Franklin, WI (US); Jingbo Liu, Grafton, WI (US); Ehsan Al-Nabi, Cambridge (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 14/971,221

(22) Filed: Dec. 16, 2015

(51) Int. Cl.
*H02P 6/08* (2016.01)
*G05B 15/02* (2006.01)

(52) U.S. Cl.
CPC ............... *H02P 6/08* (2013.01); *G05B 15/02* (2013.01)

(58) Field of Classification Search
CPC ........................................................ H02P 6/08
USPC ........................................ 318/700, 254.1, 34
See application file for complete search history.

(56) References Cited

U.S. PATENT DOCUMENTS

| | | |
|---|---|---|
| 5,032,771 A | 7/1991 | Kerkman |
| 5,526,252 A | 6/1996 | Erdman |
| 5,703,449 A | 12/1997 | Nagate |
| 5,717,305 A | 2/1998 | Seibel |
| 5,990,654 A | 11/1999 | Skibinski et al. |
| 6,222,335 B1 | 4/2001 | Hiti et al. |
| 6,965,212 B1 | 11/2005 | Wang et al. |
| 7,049,778 B2 | 5/2006 | Katanaya |
| 7,084,604 B2 | 8/2006 | Salomaki |
| 7,468,595 B2 | 12/2008 | Lee |
| 7,932,693 B2 | 4/2011 | Lee |
| 8,143,838 B2 | 3/2012 | Akiyama |
| 8,232,760 B2 | 7/2012 | Lu et al. |

(Continued)

FOREIGN PATENT DOCUMENTS

| | | |
|---|---|---|
| CN | 2513286 Y | 9/2002 |
| CN | 101383585 A | 3/2009 |

(Continued)

OTHER PUBLICATIONS

Stirban et al., "Motion-Sensorless Control of BLDC-PM Motor With Offline FEM Information Assisted State Observer"; Optimization of Electrical and Electronic Equipment (OPTIM), 2010 12th International Conference, Ma 22, 2010, pp. 321-328.

*Primary Examiner* — David S Luo
(74) *Attorney, Agent, or Firm* — Fay Sharpe LLP

(57) ABSTRACT

Methods and systems are presented for closed loop motor speed and torque control without a sensor at the motor, in which configuration parameters are received from a user interface to define operating characteristics of a filter, a transformer, a cable, and the motor coupled with the output of a motor drive, and an object model of the motor drive is configured according to the filter, transformer, cable and motor configuration parameters to facilitate sensorless closed loop motor speed and/or torque control.

24 Claims, 8 Drawing Sheets

(56) References Cited

U.S. PATENT DOCUMENTS

| | | | |
|---|---|---|---|
| 8,299,646 B2 * | 10/2012 | Rockenfeller | H02P 5/74 165/58 |
| 8,350,507 B2 | 1/2013 | Ito | |
| 8,541,971 B2 | 9/2013 | Sakai | |
| 8,890,450 B2 | 11/2014 | Maekawa | |
| 8,970,154 B2 | 3/2015 | Ishikawa et al. | |
| 8,981,702 B2 | 3/2015 | Katariya et al. | |
| 2004/0052097 A1 | 3/2004 | Morimoto | |
| 2006/0113952 A1 | 6/2006 | Zhou | |
| 2007/0001635 A1 | 1/2007 | Ho | |
| 2008/0001571 A1 | 1/2008 | Tomigashi | |
| 2009/0153083 A1 | 6/2009 | Rozman | |
| 2011/0062908 A1 | 3/2011 | Kitanaka | |
| 2011/0181232 A1 | 7/2011 | Krishnamoorthy et al. | |
| 2012/0038300 A1 | 2/2012 | Kato et al. | |

FOREIGN PATENT DOCUMENTS

| | | |
|---|---|---|
| CN | 201504207 U | 6/2010 |
| CN | 101950983 A | 1/2011 |
| CN | 102349230 A | 2/2012 |
| CN | 103190068 A | 7/2013 |
| JP | 2002034289 A | 1/2002 |

\* cited by examiner

120 ⬋

126 ⬋
```
REVERSING DIRECTIONS PARAMETERS
High Speed to Low Speed Frequency: P2054
Low Speed Minimum Frequency: P2055
Low Speed Change Direction Frequency: P2056.
Reverse Ramp Rate Control: P2072 [DW Control] Bit 05
Forward Ramp Rate Control: P2072 [DW Control] Bit 06
Hold Ramp Rate Control: P2072 [DW Control] Bit 07
```

128 ⬋
```
CLOSED LOOP SPEED & TORQUE CONTROL
           PARAMETERS
Speed Regulator Bandwidth: P636
High-Speed Id Bandwidth: P2063
High-Speed Id Damping: P2064
High-Speed Iq Bandwidth: P2065
High-Speed Iq Damping: P2066
High-Speed Estimation Ki Gain: P2067
High-Speed Estimation Kp Gain: P2068
High-Speed Estimation Ki Adjust: P2069
High Speed Feed Forward Gain: P2070
Theta Phase Locked Loop Offset: P2071
```

FIG. 6

METHODS AND SYSTEMS FOR SENSORLESS CLOSED LOOP MOTOR SPEED AND TORQUE CONTROL

BACKGROUND INFORMATION

The subject matter disclosed herein relates to sensorless control of motor speed and torque control.

BRIEF DESCRIPTION

Methods and systems are presented for closed loop motor speed and torque control without a sensor at the motor, in which configuration parameters are received from a user interface to define operating characteristics of a filter, a transformer, a cable, and the motor coupled with the output of a motor drive, and an object model of the motor drive is configured according to the filter, transformer, cable and motor configuration parameters to facilitate sensorless closed loop motor speed and/or torque control.

BRIEF DESCRIPTION OF THE DRAWINGS

FIGS. 3-6 are drive configuration parameters.

DETAILED DESCRIPTION

Figure 1:
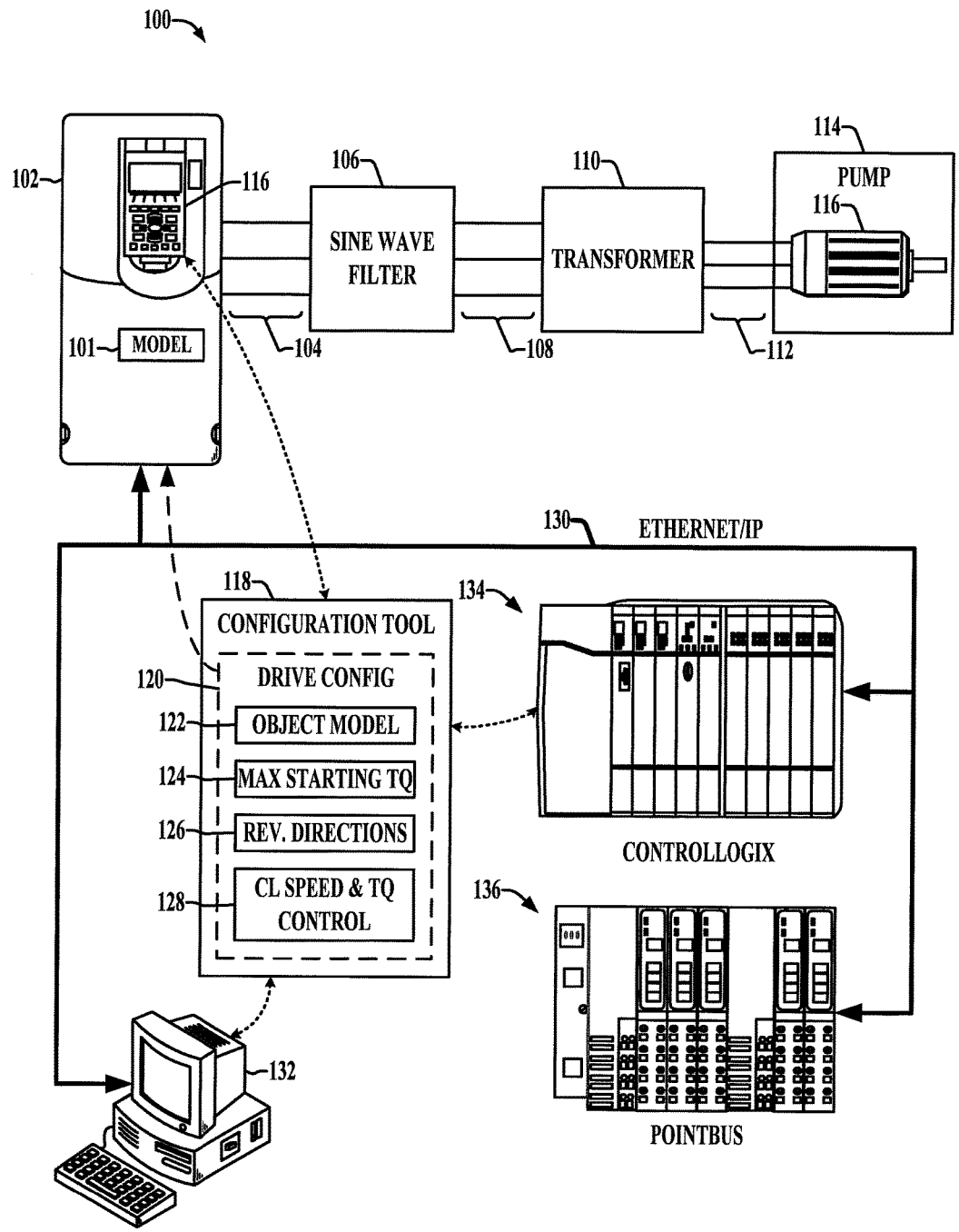
FIG. 1 is a system diagram.

FIG. 1 shows a power conversion system 100 including a variable frequency multiphase motor drive 102 with an output 104 providing a three-phase output power to the input of a sine wave filter 106. The sine wave filter 106 provides a three-phase output 108 to the input or primary windings of a step up transformer 110. The transformer 110 includes a three-phase output or secondary connected to a motor cable 112 to drive a three-phase motor 116 of a submersible pump 114. In one example, the pump motor 116 is a permanent magnet (PM) motor including surface mount magnets or interior mount magnets. The system 100 in one example is a deep well electric submersible pump (ESP) system for pumping fluids from a well. In such a system, the cable 112 is typically very long, and providing feedback sensors at the pump motor 116 is impractical. However, it is desirable to control the speed or position, as well as the torque of the pump motor 116 during pumping operation of the system 100. The motor drive 102 includes a human interface module (HIM) 116 with a user interface display and keyboard to allow user interaction with the drive 102. The drive 102 includes an object model 101 defining the controlled object, in this case the system components coupled with the drive output 104, including the filter 106, the transformer, the cable 112 and the pump motor 116. As there is no in situ motor position or speed feedback sensor at the pump 114, the use of the model 101 facilitates close loop speed and torque control to implement a fluid pumping strategy via the system 100.

In one example, the motor drive 102 is a PowerFlex® 755 drive available from Rockwell automation, although the concepts of the present disclosure can be used in other drives. The use of the model 101 as well as other configurable functions in operation of the drive 102 facilitate use in controlling permanent magnet motors 106 in deep well applications. In this example, the potentially long distance from the drive 102 to the pump motor 116 means that the motor cable 112 is very long. The use of a sine wave filter 106 facilitates operation with the long motor cable 112 by removing or mitigating the pulse width modulation (PWM) components from the drive output. In addition, the step-up transformer 110 is used to meet the required voltage at the motor load 116 while compensating for the voltage drop in the sine wave filter 106 and motor cable 112. As shown in FIG. 1, moreover, the drive 102 is connected by a network, such as an Ethernet/IP network 130 with a computer, as well as one or more control system components 134 and 136. In one example, the control system 134 is a module based Controllogix® control system manufactured by Rockwell automation, and the system 134 is connected by the network 130 with a modular I/O system 136, in one example a Pointbus® apparatus available from Rockwell automation.

A configuration tool 118 is implemented by the computer 132, and/or by the control system 134 and/or by the drive 102 via a user interface (e.g., the faceplate HIM 116 or the display and keyboard of the computer 132. The tool 118 in one example is implemented as application software executed by a processor or processors of the computer 132, the drive 102, or other processing element operatively coupled with the drive 102 via the network 130. In another non-limiting example, the configuration tool 118 can be a cloud-base application executed remotely through a web browser. The drive 102 is configured with one or more processors programmed with various firmware and/or software stored therein to implement control functions to drive the motor load 116 according to the object model 101 to support deep well ESP applications using permanent magnet motors 116. As seen in FIG. 1, the configuration tool 118 allows user programming or configuration to define a drive configuration file 120 including general motor drive parameters (not shown) as well as object model parameters 122, maximum starting torque parameters 124, reverse directions parameters 126, and closed loop speed and torque control parameters 128 in order to facilitate control of the pump motor 116 in deep well applications in which a sine wave filter 106, a transformer 110 and a motor cable 112 are used.

In one example, the user (or the control system) provides the tool 118 with individual inductance, resistance, and capacitance (LRC) values for the filter, transformer, cable, and motor to construct the configuration file 120. In one implementation, the drive 102 computes or otherwise determines a single equivalent inductance, a single equivalent resistance, and a single equivalent capacitance value for use in the model 101, representing the impedance seen by the drive 102. The drive 102 uses the equivalent system LRC values of the model 101 to control the driven motor 116 by providing output inverter switching control signals. In one example, the drive 102 is configured by a parameter from the configuration tool 118 (e.g., entered by a user) to operate the drive 102 to generate one or more test signals (e.g., drive voltages and currents) and monitor one or more system operating conditions (e.g., via feedback sensors) to determine the equivalent system LRC values without requiring entry of the individual LRC values of the filter, transformer, cable, and motor components of the system 100. This can be advantageous, for example, where the system 100 includes one or more components 106, 110 and/or 116 whose impedance parameters are not precisely known, such as a legacy motor with no nameplate, etc. For example, the tool 118 in one embodiment allows a user to enter a parameter to specify autotuning, which is provided to the drive 102 as part of the configuration file 120, and the drive 102 will perform self tuning to excite the load 106, 110 and 116 to measure the response and compute the LRC values and update the model 101.

The motor drive 102 in one example includes an input rectifier (not shown) to receive AC input power, as well as a DC bus circuit and an output inverter (not shown) operated by pulse width modulated (PWM) switching control signals in order to provide a variable frequency, variable amplitude multiphase AC output signal to the sine wave filter 106 and the subsequent components in the system 100. The drive 102 in one example operates according to programmable parameters, including parameters of the model 101 which define the characteristics of the motor 116, the sine wave filter 106, the step up transformer 110, and the motor cable 112. Further programmable parameters of the drive 102 include a speed profile for starting and for reversing through zero speed.

Control algorithms in the drive 102 advantageously address the challenges of a sine wave filter, transformer, and long cable that is presented at the drive outputs. In one example, when the drive 102 is put into run, it begins in low speed mode where motor current is regulated with a defined speed ramp profile to provide high starting torque capability. It then transitions to advanced close-loop vector control for optimized performance in the high-speed range. The drive 102 also provides advanced control capabilities for addressing special startup situations. For example, if debris is lodged in the pump 114 of the motor 116 and the rotor is locked, the normal starting process results in positive and negative torque pulses as the inverter output vector passes over the poles of the permanent magnets. If this process does not clear the debris, the drive 102 can be started with a negative speed reference, and then started with a positive speed reference to attempt to clear the debris. The control processor in the drive 102 also supports flying start to catch the motor 116 while spinning and then accelerate up to the selected speed reference. If the motor 116 is caught spinning in the reverse direction, the transition from reverse to forward speed follows a defined speed profile.

Figure 2:
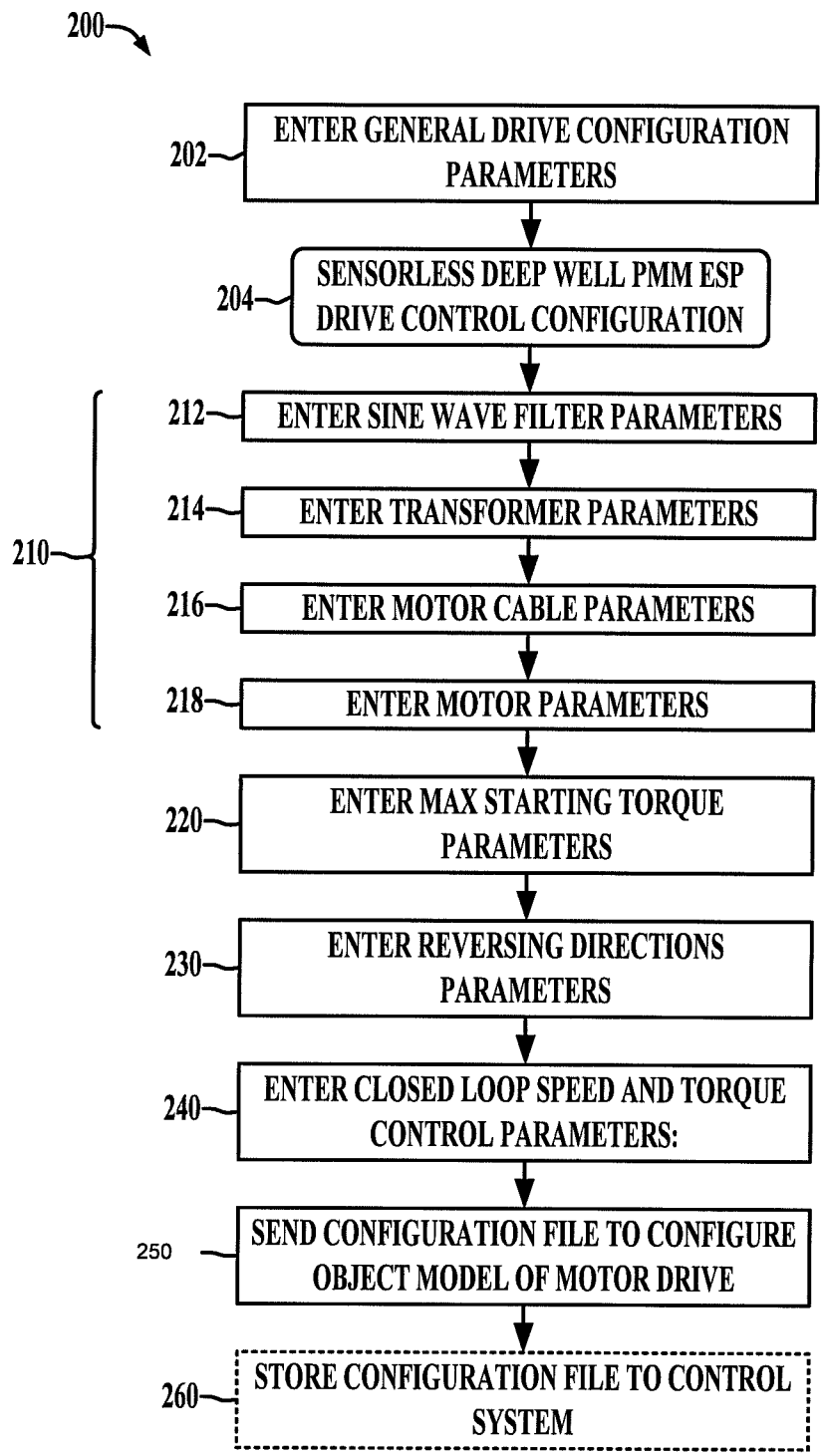
FIG. 2 is a flow diagram.

Referring also to FIGS. 2-6, the configuration tool 118 operates in one example according to a process or method 200 in FIG. 2 in order to configure the motor drive 102 to facilitate sensorless close loop control of speed and/or torque of the motor 116. In one example, the tool 118 provides appropriate user prompting to receive input parameters or other data associated with configuring the drive 102, and generates a drive configuration file 120 which is then transferred to the drive 102. The configuration tool 118 allows user configuration to define the object model parameters 122 associated with operational characteristics of the components 106, 110, 112, 116 of the system 100 for a given installation. In certain examples, the configuration tool 118 is implemented by the on-board user interface (human interface module or HIM) 116 of the drive 102 itself. In other examples, the configuration tool 118 is implemented on the computer 132 in FIG. 1. In other examples, the control system 134 may implement the configuration tool 118, for instance, via an external computer providing a user interface to interact with the tool 118 executing in the control system 134. In addition, the resulting drive configuration file 120 may be stored or saved in the control system 134. In particular, when a drive 102 is replaced after initial programming, the new drive 102 can be easily configured by downloading the previously constructed configuration file 120 from the control system 134.

Figure 3:
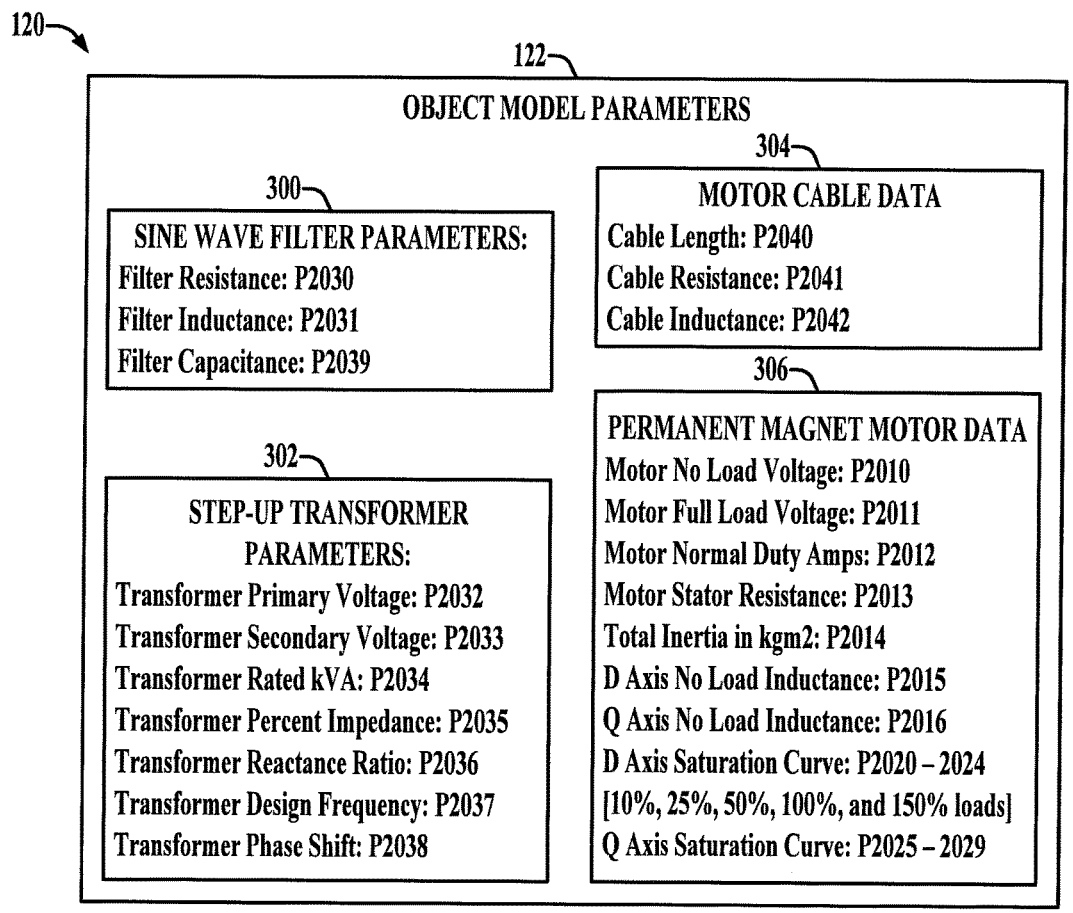

The motor drive configuration method 200 begins in FIG. 2 with entry of general drive configuration parameters at 202. Thereafter, sensorless deep well permanent magnet motor (PMM) ESP drive control configuration begins at 204. At 210, the tool 118 receives one or more configuration parameters entered by a user associated with the controlled object model 101. FIG. 3 illustrates example object model parameters 122, including sine wave filter parameters 300, step up transformer parameters 302, motor cable data parameters 304 and motor data parameters 306 for a permanent magnet motor.

At 212, the user enters, and the tool 118 receives, sine wave filter parameters 300 that define one or more operating characteristics of the filter 106. In one example, the filter configuration parameter 300 is one of a filter resistance P2030, a filter inductance P2031 and a filter capacitance P2039. The Filter Resistance parameter P2030 [Filter Resistance] in one example is set to the resistance of the reactor in the sine wave filter. The Filter Inductance parameter P2031 [Filter Inductance] in one example is set to the inductance of the sine wave filter. The Filter Capacitance parameter P2039 [Filter Capacitance] in one example is set to the capacitance of the sine wave filter.

At 214, the user enters, and the tool 118 receives one or transformer parameters 302, examples of which are shown in FIG. 3. The parameter or parameters 302 define one or more operating characteristics of the transformer 110, such as a transformer primary voltage P2032, a transformer secondary voltage P2033, a transformer rated kVA P2034, a transformer impedance P2035, a transformer reactance P2036, a transformer frequency P2037, and a transformer phase shift P2038 in one example. The Transformer Primary Voltage parameter P2032 [Xfmr Primary] in one example is set to the transformer designed primary line to line RMS voltage, which is the side of the transformer 110 connected to the sine wave filter 106. The Transformer Secondary Voltage parameter P2033 [Xfmr Secondary] is set in one example to the transformer secondary line to line RMS voltage, which is the side connected to the motor 116. The Transformer Rated kVA parameter P2034 [Xfmr Rated kVA] in one example is set to the kVA rating of the transformer 110 (e.g., 300 kVA in one example). The Transformer Percent Impedance parameter P2035 [Xfmr Impedance] is set to the percent impedance of the transformer 110, such as 3.4% in one example. The Transformer Reactance Ratio parameter P2036 [Xfmr X Z Ratio] in one example is set to the ratio of inductance to the total impedance, for instance, 0.90, and can be set to this default value and changed when a different value is supplied by the transformer manufacturer. The Transformer Design Frequency parameter P2037 [Xfmr Frequency] is set to select the design frequency of the transformer as 50 or 60 Hz in two non-limiting examples, representing the frequency used in designing the transformer flux density, and is not related to the inverter output frequency. The Transformer Phase Shift parameter P2038 [Xfmr Phase Shift] in one example is set to the phase shift across the transformer 110. For a Wye/Wye transformer, one suitable example value is 0.0 degrees. For a Delta/Wye transformer, one suitable phase shift value is 30.0 degrees, and depending on how the transformer is constructed it may be a leading or a lagging phase shift.

At 216 in FIG. 2, the user enters, and the tool 118 receives motor cable parameters 304 defining an operating characteristic of the cable 112, for example, as shown in FIG. 3. The Cable Length parameter P2040 [Cable Length] is set in one example to the length of the motor cable and meters (e.g., 1000 m, depending upon a particular installation). The cable resistance parameter P2041 is set to the cable resistance in mOhms per meter (e.g., 5.0 mOhm/m). The Cable Inductance parameter P2042 [mH Per Meter] is set to the motor cable inductance in mH per meters, for example, 0.400 mH/m.

At 218, the user enters, and the tool 118 receives one or more motor configuration parameters 306 to define one or more operating characteristics of the motor 116. Certain motor parameters are associated with values at the inverter of the drive 102 (e.g., transformer primary), and other motor configuration parameters parentheses e.g., numbers 2000 and above) are associated with values at the motor terminals (e.g., transformer secondary). The following motor configuration parameters are non-limiting examples corresponding to a typical motor and step-up transformer, and the values to a particular load will change for a different motor 116 and step-up transformer 110.

Motor Nameplate Voltage: P25 [Motor NP Volts]. This parameter is set to the voltage the inverter is producing when the motor 116 is operating at full load in one example. This is the Motor Full Load Voltage, multiplied by the transformer primary voltage, divided by the transformer secondary voltage (P25=P2011*P2032/P2033). The actual no load and full load motor voltages are entered in parameters 2010 and 2011. Example: [Motor NP Volts]=[Mtr FL Voltage]*[Xfmr Primary]/[Xfmr Secondary]293.95 VAC=2520*480/4115.

Motor Nameplate Amps: P26 [Motor NP Amps]. This parameter in one example is set to the current the inverter is producing when the motor is operating at full load. This is the Motor Normal Duty Amps times the transformer secondary voltage divided by the transformer primary voltage (P26=P2012*P2033/P2032). The actual motor rated current is entered in parameter 2012. Example: [Motor NP Amps]=[MtrNormalDutyAmps]*[Xfmr Secondary]/[Xfmr Primary] 156.88 Amps=18.3*4115/480.

Motor Nameplate Hertz: P27 [Motor NP Hertz]. This parameter may be set to the rated motor frequency. Example: [Motor NP Hertz]=100.00 Hz.

Motor Nameplate RPM: P28 [Motor NP RPM]. This parameter may be set to the rated speed for the motor that corresponds with the rated frequency. Example: [Motor NP RPM]=3000.00 RPM.

Motor Nameplate Power Units: P29 [Motor NP Pwr Units]. The motor power can be entered in HP or in kW. This parameter selects the units of the next parameter.

Motor Nameplate Power: P30 [Motor NP Power]. This parameter may be set to the rated power for the motor that corresponds with the rated speed. Example: [Motor NP Power]=94 HP or 70 kW.

Motor Poles: P31 [Motor Poles]. This parameter may be set to the number of poles on the motor. Example: [Motor Poles]=4.

Motor Control Mode: P35 [Motor Ctrl Mode]. This parameter is set to PMM Deep Well to select the OEM Deep Well PMM control mode. Example: [Motor Ctrl Mode]=PMM DeepWell.

Maximum Voltage: P36 [Maximum Voltage]. This parameter may be set to the maximum voltage the inverter produces. Example: [Maximum Voltage]=480.00 VAC.

Maximum Frequency: P37 [Maximum Freq]. This parameter may be set to the maximum frequency the inverter produces. Example: [Maximum Freq]=130.00 Hz.

Total Inertial: P76 [Total Inertia]. When P2014 [Inertia kgm2] is set to 0.001, this parameter may be set to the total inertia of the motor and pump in seconds to accelerate to rated speed with rated torque. If there is no pump inertia data is available, the total inertia listed on the motor data sheet may be multiplied by 2. When parameter P2014 is greater than 0.001 this parameter displays the total inertia in seconds as calculated from the kgm$^2$ value that is entered in P2014. Example: [Total kgm2]=0.018*2=0.036 kgm$^2$ Drive Overload Mode: P420 [Drive OL Mode]. The drive overload parameter may be set to Reduce CLmt. Example: [Drive OL Mode]=Reduce CLmt The following motor configuration parameters 306 advantageously facilitate speed and/or torque control in sensorless deep well applications.

Motor No Load Voltage: P2010 [Mtr NL Voltage]. This parameter may be set to the motor voltage when running with no load at rated frequency. This information may be supplied by the motor manufacturer. Example: [Mtr NL Voltage]=2297.0 VAC.

Motor Full Load Voltage: P2011 [Mtr FL Voltage]. This parameter may be set to the motor voltage when running at full load at rated frequency. This information may be supplied by the motor manufacturer. Example: [Mtr FL Voltage]=2520.0 VAC.

Motor Normal Duty Amps: P2012 [MtrNormalDutyAmp]. This parameter may be set to the rated current for the motor when the motor is applied in a normal duty environment. When derating the motor for heavy-duty operation this parameter may remain the normal duty value and P26 [Motor NP Amps] is based on the derated value. This information may be obtained from the motor manufacturer. Example: [MtrNormalDutyAmps]=18.3 Amps.

Motor Stator Resistance: P2013 [Stator Resistance]. This parameter may be set to the stator resistance of one phase. This information may be supplied by the motor manufacturer. If the stator resistance is listed at room temperature, that value may be multiplied by 1.4. Example: [Stator Resistance]=3.18@20° C.=3.18*1.4=4.4520 Ohms.

Total Inertia in kgm$^2$: P2014 [Total kgm2]. This parameter can be set to the kg m$^2$ of the motor and the pump. When set to a value greater than 0.000, this value is used to calculate the value for P76 so the inertia may be entered in seconds or in kg m$^2$. Example: [Total kgm2]= 0.018*2=0.036 kgm$^2$.

D Axis No Load Inductance: P2015 [Ld No Load]. This parameter may be set to the Ld inductance of the motor when operating at no load. This information may be supplied by the motor manufacturer. Example: [Ld No Load]=88.0 mH.

Q Axis No Load Inductance: P2016 [Lq No Load]. This parameter may be set to the Lq inductance of the motor when operating at no load. This information may be supplied by the motor manufacturer. Example: [Lq No Load]=88.0 mH.

D Axis Saturation Curve: P2020-2024 [Ld Sat n Pcnt]. Parameters 2020 through 2024 may be set to the values defining the D axis Inductance Saturation Curve for loads of 10%, 25%, 50%, 100%, and 150%. This information may be supplied by the motor manufacturer.

Example: [Ld Sat 10 Pcnt]=99%
[Ld Sat 25 Pcnt]=96%
[Ld Sat 50 Pcnt]=89%
[Ld Sat 100 Pcnt]=72%
[Ld Sat 150 Pcnt]=65%

Q Axis Saturation Curve: P2025-2029 [Lq Sat n Pcnt]. Parameters 2025 through 2029 may be set to the values defining the D axis Inductance Saturation Curve for loads of 10%, 25%, 50%, 100%, and 150%. This information may be supplied by the motor manufacturer.

Example: [Lq Sat 10 Pcnt]=99%
[Lq Sat 25 Pcnt]=96%
[Lq Sat 50 Pcnt]=89%

[Lq Sat 100 Pcnt]=72%

[Lq Sat 150 Pcnt]=65%

Figure 4:
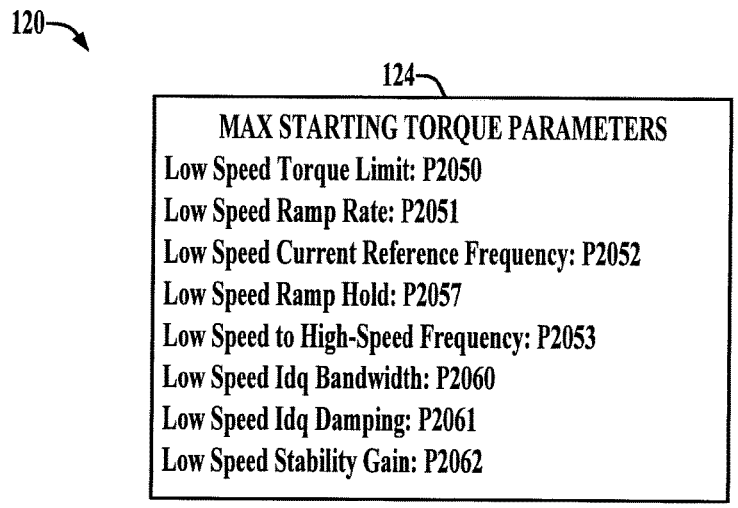

Continuing at 220 in FIG. 2, the user enters, and the tool 118 receives maximum starting torque parameters 124, examples of which are shown in FIG. 4. These parameters 124 are used by the drive 102 to control the starting speed profile to accelerate the controlled motor 116. For example, when the drive 102 is put into run, the Starting Speed Profile controls the output current, frequency and acceleration rate to provide high starting torque. The following parameters define the frequencies and acceleration rates for this starting profile. In most cases, these parameters can remain at their default values.

Low Speed Torque Limit: P2050 [LS Torque Limit]. This parameter selects the level of torque reference in the low speed region when the drive is put in run. This parameter defaults to a value of 100%. The PMM DW application allows starting at up to 150% but the normal duty drive overload limit only allows 150% for 3 seconds and if the starting profile takes longer than 3 seconds then the drive will fault on Drive Overload and the start will not be successful. If the torque required to start is greater than 100% then this value may be increased. The [Low Speed Ramp Hold] time may then need to be reduced.

Low Speed Ramp Rate: P2051 [LS Ramp Rate]. This parameter selects the acceleration rate when the drive is put into run and when the ramp resumes after the Low Speed Ramp Hold, and is entered in one example as a time to maximum frequency. For instance, if the time is entered is 100 seconds and maximum frequency is 100.0 Hz, the drive 102 will ramp to 5.0 Hz in 5.0 seconds.

Low Speed Current Reference Frequency: P2052 [LS CurRef Freq]. This parameter selects the frequency at which the output current reaches the LS Torque Limit value. The start profile maintains this frequency for the time defined in the [LS Ramp Hold] parameter.

Low Speed Ramp Hold: P2057 [LS Ramp Hold]. This parameter sets how long the frequency is held constant by the drive 102 at [LS CurRef Freq] and the Torque Reference is held at [LS Torque Limit]. After this delay, the drive resumes frequency ramping up at the Low Speed Ramp Rate.

Low Speed to High-Speed Frequency: P2053 [LS to HS Freq]. This parameter selects the frequency at which the drive 102 transitions from Low Speed Mode to High-Speed Mode. This parameter may be set to a value that is greater than the value set in P2054 [HS to LS Freq] in one example. In one example, this parameters set to be greater than (P2054+0.5). The speed reference and acceleration rate are then controlled by the standard speed control parameters.

Continuing at 230 in FIG. 2, the user enters, and the tool 118 receives reversing directions parameters 126 (FIG. 5) defining control by the drive 102 in order to reverse the motor 116 through zero speed. The reversing through zero speed profile is used in one example after a flying start catches a motor 116 spinning in the reverse direction, and order to resume normal pump operation. The following parameters 126 define the frequencies and acceleration rates for the transition from reverse to forward. In one example, the reversing through zero speed profile is only used in going from reverse to forward. When changing from forward to reverse, the drive 102 in certain examples will coast to stop when the output frequency drops below the value set by the parameter P2053.

High Speed to Low Speed Frequency: P2054 [HS to LS Freq]. When reversing through zero, this parameter selects the frequency at which the drive 102 transitions from High-Speed Mode to Low Speed Mode to begin using the deceleration rate that is defined by the low-speed ramp rate parameter P2051 [LS Ramp Rate]. The value of the parameter P2054 in one example is set to be less than the value set in P2053 [LS to HS Freq], for example P2053>(P2054+0.5).

Low Speed Minimum Frequency: P2055 [LS Minimum Freq]. When reversing through zero, this parameter selects the minimum reverse frequency, where the output jumps from reverse to forward rotation to avoid very low frequencies in the transformer 110.

Low Speed Change Direction Frequency: P2056 [LS ChngDir Freq]. When reversing through zero, this parameter selects the positive frequency the inverter jumps to when changing from reverse to forward and then accelerates to the selected speed.

The tool 118 allows the user to set or select various ramp rate options. In particular, the drive 102 may implement several options for the manner in which the output frequency can change from reverse to forward.

Reverse Ramp Rate Control: P2072 [DW Control] Bit 05 "RevRampRate". When reversing through zero, this bit selects the ramp rate to use while ramping toward zero in the low speed mode. The bit is turned off to use the rate in P2051. When the bit is set, the deceleration to zero uses the normal high-speed ramp rate.

Forward Ramp Rate Control: P2072 [DW Control] Bit 06 "FwdRampRate". When reversing through zero, this bit selects the ramp rate to use while ramping away from zero in the low speed mode. The bit is turned off to use the rate in P2051. When the bit is set, the acceleration from zero uses the normal high-speed ramp rate.

Hold Ramp Rate Control: P2072 [DW Control] Bit 07 "HoldRampRate". When reversing through zero, this bit selects the hold on frequency while ramping away from zero in the low speed mode. The bit is turned on to use the time in P2057. When the bit is turned off, the hold on output frequency is disabled.

At 240 in FIG. 2, the user enters, and the tool 118 receives closed-loop speed and torque control parameters 128 which define operation of the drive 102 in order to regulate motor speed and/or motor torque without speed feedback. These parameters implement control gain data and tune the response of the drive 102. An example set of the parameters 128 is illustrated in FIG. 6.

Speed Regulator Bandwidth: P636 [Speed Reg BW]. This parameter may be set to the desired bandwidth of the speed regulator. PMM Speed Loop Tuning is accomplished in one example using the following parameters: (1) P2063 [HS Id Bandwidth], Default=250.0 R/S; (2) P2065 [HS Iq Bandwidth], Default=250.0 R/S; (3) P2068 [HS Spd Est Kp], Default=300.0; and (4) P636 [Speed Reg BW], Default=5.00. If instability is seen in the Speed Loop, the following steps may be performed. After each step, instability or lack thereof should be again verified. Once stability is achieved, the subsequent steps are not required: (1) Increase the current loop band. Set [HS Iq Bandwidth] to 400.0 R/S; (2) Increase the Speed Estimation Gain. Set [HS Spd Est Kp] to 350.0; (3) Increase the current loop bandwidth again. Set [HS Id Bandwidth] to 300.0 R/S, and set [HS Iq Bandwidth] to 500.0 R/S; (4) Increase the Speed Estimation Gain again. Set [HS Spd Est Kp] to 400.0; Increase the current loop bandwidth again. Set [HS Iq Bandwidth] to 600.0 R/S; (6) Increase the Speed Estimation Gain again. Set [HS Spd Est Kp] to 450.0; and (7) Decrease the Speed Regulator Bandwidth. Set [Speed Reg BW] to 4.0, 3.0, 2.0, 1.0.

Low Speed Idq Bandwidth: P2060 [LS Idq Bandwidth]. This parameter sets the desired bandwidth of the current regulators used in low speed mode.

Low Speed Idq Damping: P2061 [LS Idq Damping]. This parameter sets the desired damping of current regulators used in low speed mode.

Low Speed Stability Gain: P2062 [LS StabCtrl Gain]. This parameter sets the desired gain of the stability control used in the low speed mode current regulators. The feature is enabled by default in P2072 [DW Control] Bit 9 "Stab Ctrl".

High-Speed Id Bandwidth: P2063 [HS Id Bandwidth]. This parameter may be set to the desired bandwidth of the high-speed mode D-axis current regulators.

High-Speed Id Damping: P2064 [HS Id Damping]. This parameter may be set to the desired damping of the high-speed mode D-axis current regulators.

High-Speed Iq Bandwidth: P2065 [HS Iq Bandwidth]. This parameter may be set to the desired bandwidth of the high-speed mode Q-axis current regulators.

High-Speed Iq Damping: P2066 [HS Iq Damping]. This parameter may be set to the desired damping of the high-speed mode Q-axis current regulators.

High-Speed Estimation Ki Gain: P2067 [HS Spd Est Ki]. This parameter may be set to the integral gain for the speed estimation observer.

High-Speed Estimation Kp Gain: P2068 [HS Spd Est Kp]. This parameter may be set to the proportional gain for the speed estimation observer.

High-Speed Estimation Ki Adjust: P2069 [HS SpdEst Ki Adj]. This parameter may be set to the gain adjusting the Estimation Ki under light load conditions.

High Speed Feed Forward Gain: P2070 [HS FeedFwd Gain]. This parameter may be set to the gain on voltage feedback to calculate the feed forward in speed estimation.

Theta Phase Locked Loop Offset: P2071 [Theta PLL Offset]. This parameter may be set to the offset on the phase angle produced by the Phase Locked Loop tracking the rotor position.

At 250 in FIG. 2, the configuration tool 118 sensed the configuration file 120 to the drive 102 in order to configure the object model 101 and other operating parameters used by the drive 102 in controlling the pump motor 116. In certain examples, moreover, the configuration file 120 may be stored or saved to the control system 134 (FIG. 1) at 260 in FIG. 2. In this manner, subsequent change out of the drive 102 can be quickly undertaken by simply downloading the configuration file 120 from the control system 134 to the replaced drive 102.

Figure 7:
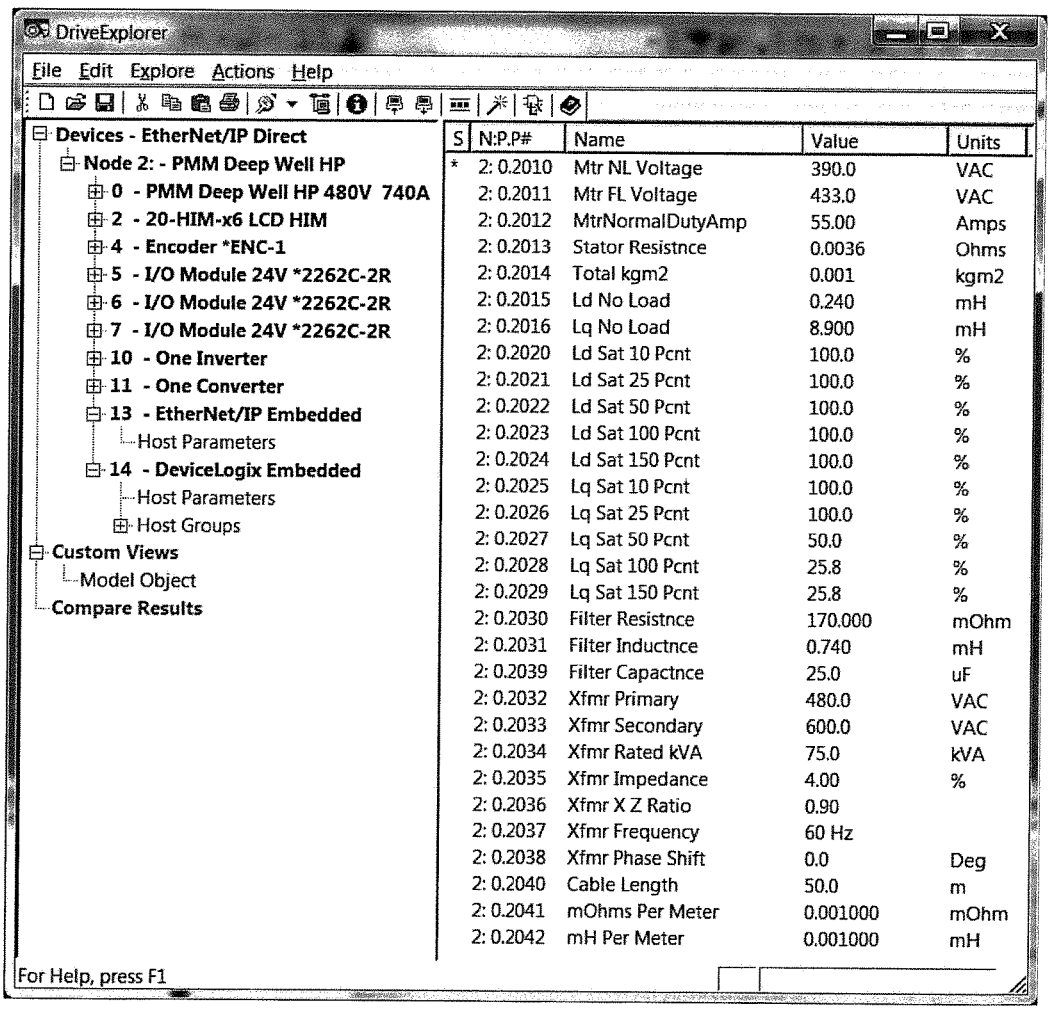
FIGS. 7-10 are screenshots.
Figure 8:
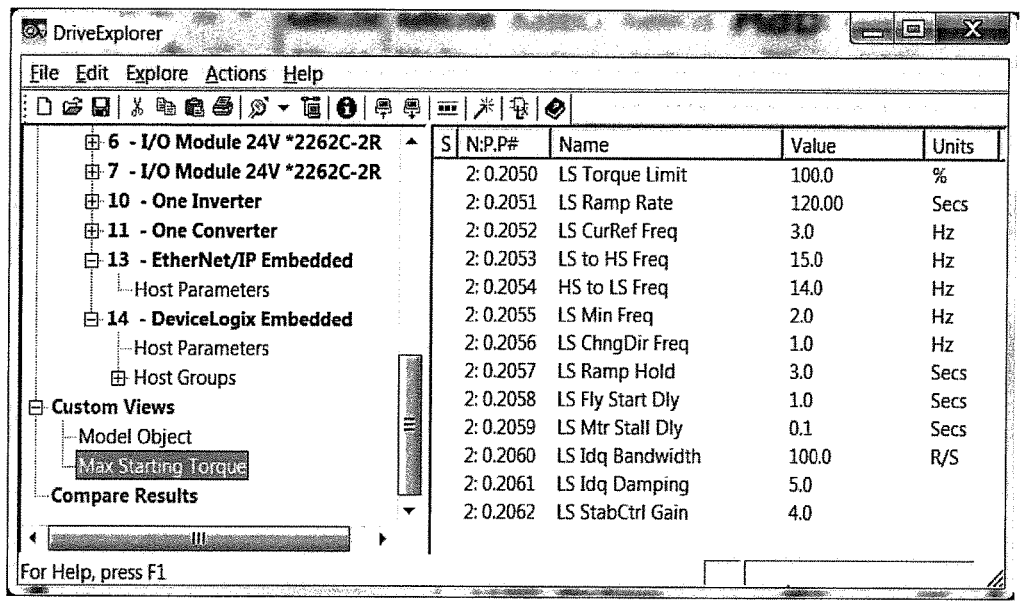
Figure 9:
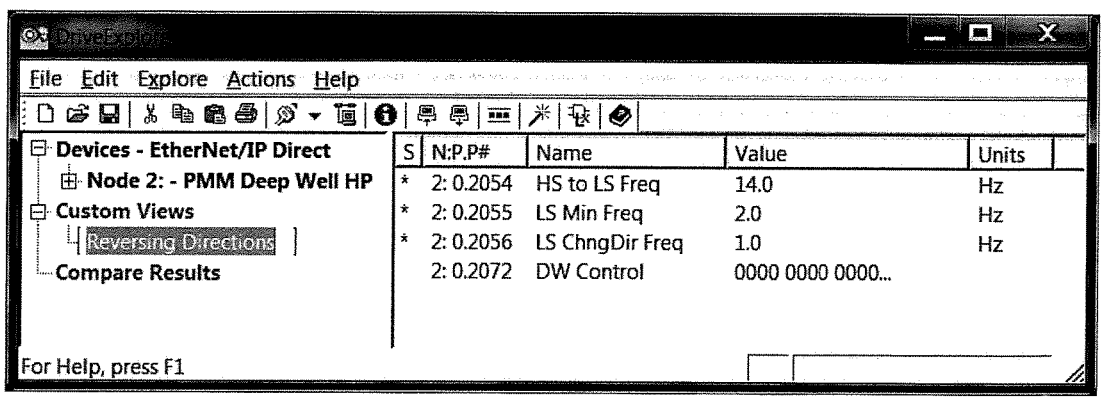
Figure 10:
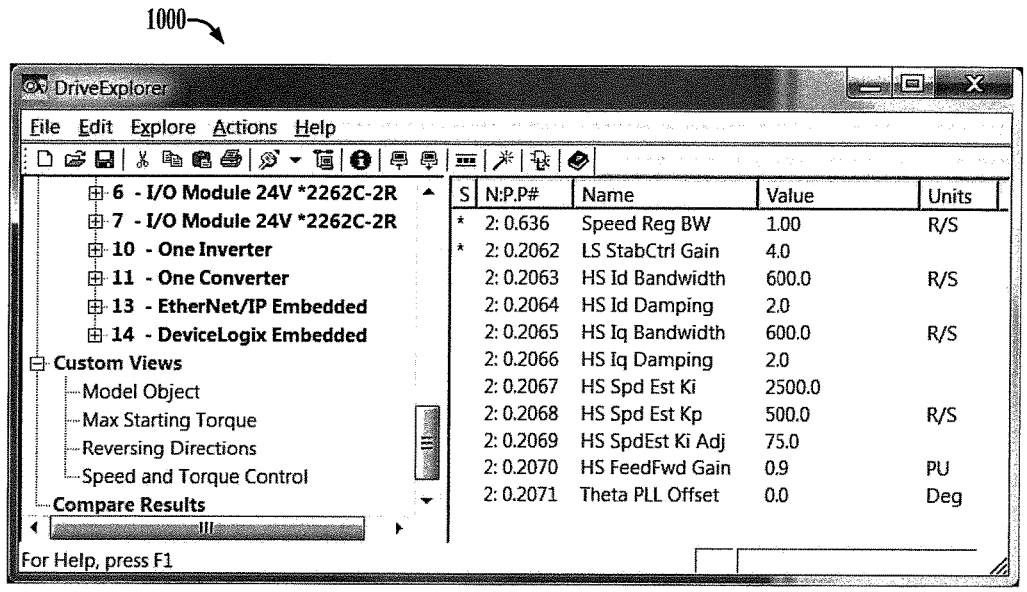
Figure 11:
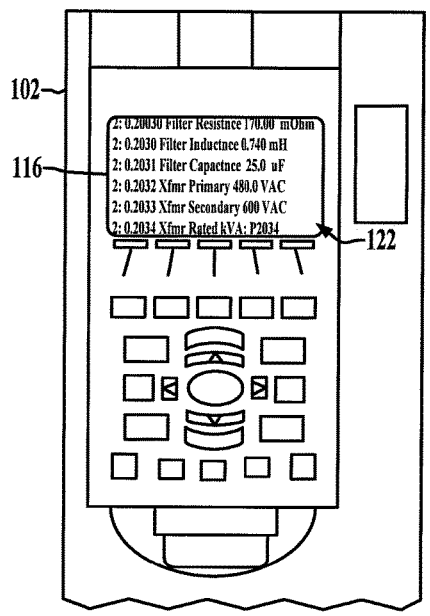
FIG. 11 is a partial front elevation view.

Referring now to FIGS. 7-11, the methods 200 and tools 118 may further provide for display of one or more of the parameters, such as the filter, transformer, cable and/or motor configuration parameters 300, 302, 304, 306. As seen in FIG. 7, the configuration tool 118 may be implemented as a computer application program (e.g., implemented on the computer 132 in FIG. 1) providing various display screens that allow a user to select, enter and/or modify one or more of the parameter values 300, 302, 304 and/or 306. FIG. 7 shows a non-limiting example display screen 700 allowing a user to modify various parameters P2010-P2042 by simply clicking the parameter, and adjusting the value accordingly. FIGS. 8 and 9 respectively illustrate display screen shots 800 and 900 depicting display and user adjustment of example parameters relating to the maximum starting torque, and reversing directions parameters 124 and 126 discussed above (e.g., Fix. 4 and 5). A screenshot 1000 in FIG. 10 illustrates the display screen rendering for various speed and torque control parameters 128 (e.g., FIG. 6 above). FIG. 11 illustrates an example display rendering of various parameters for user entry and/or modification using a display screen 122 of the human interface module (HIM) 116 of the drive 102.

Figure 12:
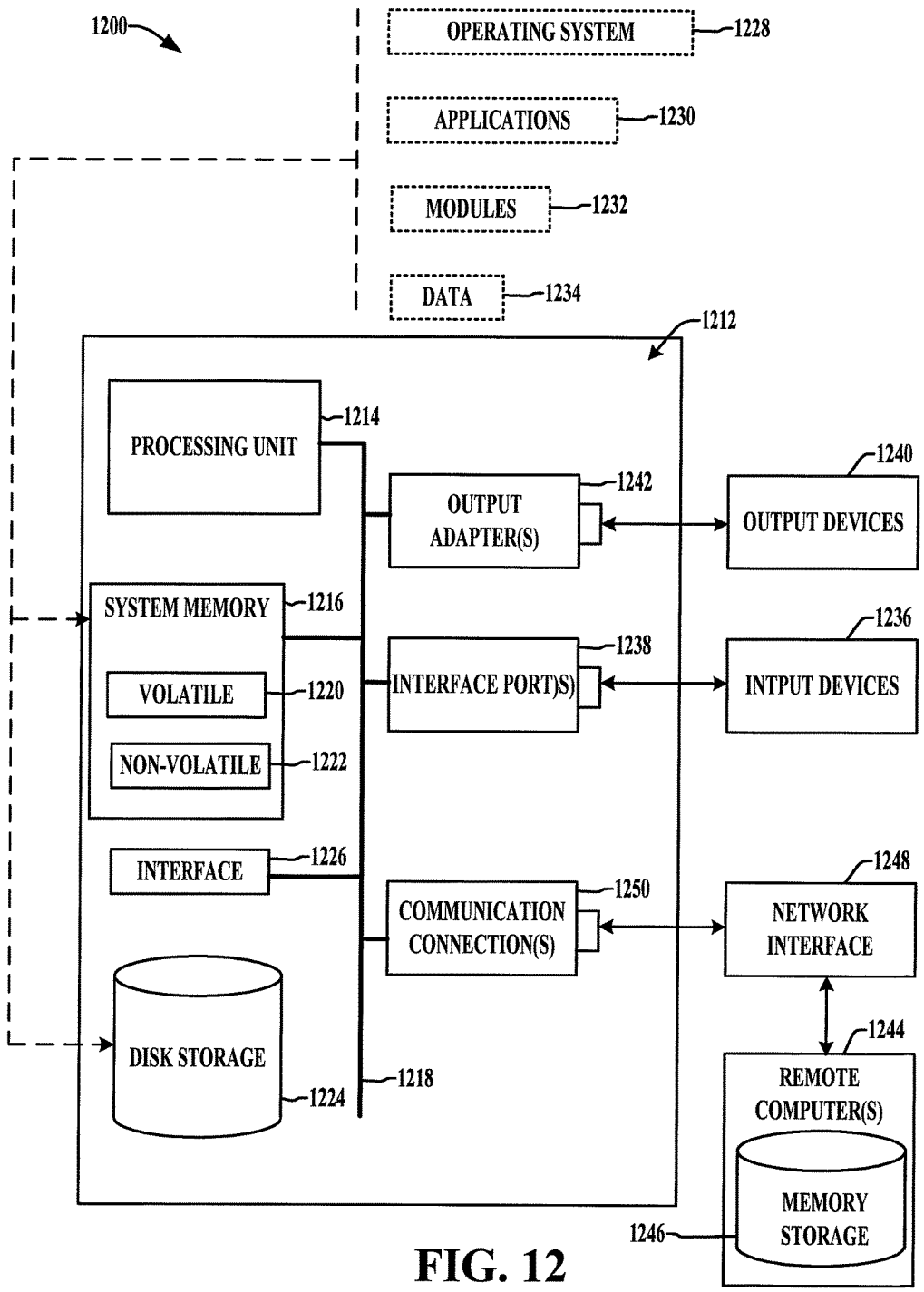
FIG. 12 illustrates an exemplary operating environment that can be employed in accordance with the claimed subject matter.

With reference to FIG. 12, an exemplary environment 1200 for implementing various aspects of the claimed subject matter includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), or flash memory. Volatile memory 1220 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in the suitable operating environment 1200. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the claimed subject matter can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims. In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter. In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A computer or machine-readable medium includes any mechanism for storing or transmitting information in a non-transitory form readable by a machine (e.g., a computer). For instance, a machine-readable medium includes read only memory ("ROM"); random access memory ("RAM"); magnetic disk storage media; optical storage media; and flash memory devices, just to mention a few examples. The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims. In the preceding specification, various embodiments have been described with reference to the accompanying drawings. It will, however, be evident that various modifications and changes may be made thereto, and additional embodiments may be implemented, without departing from the broader scope of the invention as set forth in the claims that follow.

The specification and drawings are accordingly to be regarded in an illustrative rather than restrictive sense.

The following is claimed:

1. A method of configuring a motor drive to facilitate sensorless closed loop control of at least one of speed and torque of a motor, the method comprising:
   receiving at least one filter configuration parameter defining an operating characteristic of a filter coupled with an output of a motor drive;
   receiving at least one transformer configuration parameter defining an operating characteristic of a transformer with primary windings coupled with an output of the filter;
   receiving at least one motor configuration parameter defining an operating characteristic of a motor coupled with secondary windings of the transformer; and
   configuring an object model of the motor drive according to the filter, transformer, and motor configuration parameters.

2. The method of claim 1, comprising:
   receiving at least one cable configuration parameter defining an operating characteristic of a cable coupled between the motor and the secondary windings of the transformer; and
   configuring the object model according to the filter, transformer, cable and motor configuration parameters.

3. The method of claim 2, wherein the cable configuration parameter is one of a cable length, a cable resistance, and a cable inductance.

4. The method of claim 1, wherein the filter configuration parameter is one of a filter resistance, a filter inductance and a filter capacitance.

5. The method of claim 1, wherein the transformer configuration parameter is one of a transformer primary voltage, a transformer secondary voltage, a transformer rated kVA, a transformer impedance, a transformer reactance, a transformer frequency, and a transformer phase shift.

6. The method of claim 1, wherein the motor configuration parameter is one of a motor no load voltage, a motor full load voltage, a motor normal duty amps, a motor stator resistance, a total inertia, a D axis no load inductance, a Q axis no load inductance, a D axis saturation curve, and a Q axis saturation curve.

7. The method of claim 1, comprising:
   receiving at least one maximum starting torque configuration parameter defining closed loop control to accelerate the motor; and
   configuring the motor drive according to the maximum starting torque configuration parameter.

8. The method of claim 7, wherein the maximum starting torque configuration parameter is one of a low speed torque limit, a low speed ramp rate, a low speed current reference frequency, a low speed ramp hold, a low speed to high-speed frequency, a low speed idq bandwidth, a low speed idq damping, and a low speed stability gain.

9. The method of claim 1, comprising:
   receiving at least one reversing parameter defining control to reverse the motor through zero speed; and
   configuring the motor drive according to the reversing parameter.

10. The method of claim 9, wherein the reversing parameter is one of a high speed to low speed frequency, a low speed minimum frequency, a low speed change direction frequency, a reverse ramp rate control, a forward ramp rate control, and a hold ramp rate control.

11. The method of claim 1, comprising:
    receiving at least one closed loop control parameter defining control to regulate at least one of motor speed and motor torque without speed feedback; and
    configuring the motor drive according to the closed loop control parameter.

12. The method of claim 11, wherein the closed loop control parameter is one of a speed regulator bandwidth, a high-speed id bandwidth, a high-speed id damping, a high-speed iq bandwidth, a high-speed iq damping, a high-speed estimation Ki gain, a high-speed estimation Kp gain, a high-speed estimation Ki adjust, a high speed feed forward gain, and a theta phase locked loop offset.

13. The method of claim 1, comprising storing a configuration file including the object model in a control system.

14. The method of claim 1, comprising displaying at least one of the filter, transformer, and motor configuration parameters.

15. A system to configure a motor drive to facilitate sensorless closed loop control of at least one of speed and torque of a motor, comprising:
at least one processor programmed to:
receive at least one filter configuration parameter defining an operating characteristic of a filter coupled with an output of a motor drive;
receive at least one transformer configuration parameter defining an operating characteristic of a transformer with primary windings coupled with an output of the filter;
receive at least one motor configuration parameter defining an operating characteristic of a motor coupled with secondary windings of the transformer; and
configure an object model of the motor drive according to the filter, transformer, and motor configuration parameters.

16. The system of claim 15, comprising a user interface to display at least one of the filter, transformer, and motor configuration parameters.

17. The system of claim 15, wherein the at least one processor is programmed to receive at least one cable configuration parameter defining an operating characteristic of a cable coupled between the motor and the secondary windings of the transformer; and configure the object model according to the filter, transformer, cable and motor configuration parameters.

18. A computer readable medium, comprising computer executable instructions for:
receiving at least one filter configuration parameter defining an operating characteristic of a filter coupled with an output of a motor drive;
receiving at least one transformer configuration parameter defining an operating characteristic of a transformer with primary windings coupled with an output of the filter;
receiving at least one motor configuration parameter defining an operating characteristic of a motor coupled with secondary windings of the transformer; and
configuring an object model of the motor drive according to the filter, transformer, and motor configuration parameters.

19. The computer readable medium of claim 18, comprising computer executable instructions for:
receiving at least one cable configuration parameter defining an operating characteristic of a cable coupled between the motor and the secondary windings of the transformer; and
configuring the object model according to the filter, transformer, cable and motor configuration parameters.

20. The computer readable medium of claim 19, wherein the cable configuration parameter is one of a cable length, a cable resistance, and a cable inductance.

21. The computer readable medium of claim 18, wherein the filter configuration parameter is one of a filter resistance, a filter inductance, and a filter capacitance.

22. The computer readable medium of claim 18, wherein the transformer configuration parameter is one of a transformer primary voltage, a transformer secondary voltage, a transformer rated kVA, a transformer impedance, a transformer reactance, a transformer frequency, and a transformer phase shift.

23. The computer readable medium of claim 18, wherein the motor configuration parameter is one of a motor no load voltage, a motor full load voltage, a motor normal duty amps, a motor stator resistance, a total inertia, a D axis no load inductance, a Q axis no load inductance, a D axis saturation curve, and a Q axis saturation curve.

24. A method of configuring a motor drive to facilitate sensorless closed loop control of at least one of speed and torque of a motor, the method comprising:
receiving at least one configuration parameter indicating an autotuning operating mode of a motor drive; and
configuring the motor drive according to the at least one configuration parameter to cause the motor drive to automatically determine at least one impedance value associated with a filter, a transformer, a motor cable and a motor connected to the motor drive, and to control a speed of the motor at least partially according to the determined impedance value.

* * * * *